(12) United States Patent
Wang et al.

(10) Patent No.: US 11,881,050 B2
(45) Date of Patent: Jan. 23, 2024

(54) METHOD FOR DETECTING FACE SYNTHETIC IMAGE, ELECTRONIC DEVICE, AND STORAGE MEDIUM

(71) Applicant: BEIJING BAIDU NETCOM SCIENCE AND TECHNOLOGY CO., LTD., Beijing (CN)

(72) Inventors: Keyao Wang, Beijing (CN); Haocheng Feng, Beijing (CN); Haixiao Yue, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 301 days.

(21) Appl. No.: 17/347,854

(22) Filed: Jun. 15, 2021

(65) Prior Publication Data

US 2021/0312162 A1 Oct. 7, 2021

(30) Foreign Application Priority Data

Jul. 15, 2020 (CN) .......................... 202010681942.6

(51) Int. Cl.
*G06V 40/00* (2022.01)
*G06V 40/16* (2022.01)
(Continued)

(52) U.S. Cl.
CPC ............. *G06V 40/168* (2022.01); *G06N 3/08* (2013.01); *G06T 7/74* (2017.01); *G06V 10/764* (2022.01);
(Continued)

(58) Field of Classification Search
CPC ..................... G06N 3/08; G06N 3/045; G06T 2207/20081; G06T 7/0002; G06T 7/11;
(Continued)

(56) References Cited

U.S. PATENT DOCUMENTS

| 2018/0150684 | A1* | 5/2018 | Wang | ........................ | G06N 3/08 |
| 2020/0175290 | A1* | 6/2020 | Raja | ........................ | G06N 3/045 |
| 2022/0343683 | A1* | 10/2022 | Chen | ........................ | G06V 10/82 |

FOREIGN PATENT DOCUMENTS

| CN | 103745235 A | 4/2014 |
| CN | 108229363 A | 6/2018 |

(Continued)

OTHER PUBLICATIONS

Akhtar et al, A Comparative Evaluation of Local Feature Descriptors for DeepFakes Detection, IEEE International Symposium on Technologies for Homeland Security (HST) (Year: 2019).*

(Continued)

*Primary Examiner* — Ping Y Hsieh
*Assistant Examiner* — Xiao Liu
(74) *Attorney, Agent, or Firm* — Osha Bergman Watanabe & Burton LLP (57) ABSTRACT

A method for detecting a face synthetic image, an electronic device and a storage medium are provided. The technical solution includes inputting a face image to be detected into a pre-trained convolution neural network to obtain a raw image feature of the face image; inputting the raw image feature into a first full connected layer and a second full connected layer respectively to obtain a first feature vector corresponding to a face key point of the face image and a second feature vector corresponding to the face image; merging the first feature vector and the second feature vector to obtain a merged feature vector; inputting the merged feature vector to a third full connected layer to obtain a detection result of the face image.

20 Claims, 5 Drawing Sheets

(51) Int. Cl.
  *G06T 7/73*    (2017.01)
  *G06N 3/08*    (2023.01)
  *G06V 40/40*   (2022.01)
  *G06V 10/764*  (2022.01)
  *G06V 10/80*   (2022.01)
  *G06V 10/82*   (2022.01)

(52) U.S. Cl.
  CPC ............ *G06V 10/806* (2022.01); *G06V 10/82* (2022.01); *G06V 40/162* (2022.01); *G06V 40/165* (2022.01); *G06V 40/40* (2022.01); *G06V 40/45* (2022.01); *G06T 2207/20081* (2013.01); *G06T 2207/20084* (2013.01); *G06T 2207/20132* (2013.01); *G06T 2207/30201* (2013.01)

(58) Field of Classification Search
  CPC ... G06T 2207/30201; G06T 7/73; G06T 7/74; G06T 2207/20084; G06T 2207/20132; G06F 18/253; G06F 18/24; G06F 18/22; G06F 21/31; G06F 21/30; G06F 11/2263; G06V 10/82; G06V 10/764; G06V 40/161; G06V 40/168; G06V 40/172; G06V 10/25; G06V 40/171; G06V 40/165; G06V 10/40; G06V 40/16; G06V 40/45; G06V 40/174; G06V 40/40; G06V 40/193; G06V 20/695; G06V 10/20; G06V 40/173; G06V 10/771
  See application file for complete search history.

(56) References Cited

FOREIGN PATENT DOCUMENTS

| | | | | | |
|---|---|---|---|---|---|
| CN | 108345818 | A | | 7/2018 | |
| CN | 108446674 | A | | 8/2018 | |
| CN | 109684911 | A | * | 4/2019 | ......... G06K 9/00228 |
| CN | 109684911 | A | | 4/2019 | |
| CN | 110046551 | A | * | 7/2019 | ......... G06K 9/00288 |
| CN | 110210393 | A | | 9/2019 | |
| CN | 110211563 | A | | 9/2019 | |
| CN | 110321845 | A | | 10/2019 | |
| CN | 110659582 | A | | 1/2020 | |
| CN | 110930547 | A | | 3/2020 | |
| CN | 111222434 | A | | 6/2020 | |
| CN | 111274987 | A | | 6/2020 | |
| CN | 111339832 | A | | 6/2020 | |
| CN | 111368666 | A | | 7/2020 | |
| WO | 2009107237 | A1 | | 9/2009 | |
| WO | 2019090769 | A1 | | 5/2019 | |

OTHER PUBLICATIONS

Kang et al, Utilizing Reverse Viewshed Analysis in Image Geo-Localization, Proceedings of the 2nd ACM SIGSPATIAL Workshop on Recommendations for Location-based Services and Social Networks, No. 6, pp. 1-5, Nov. 2018.*
De Souza et al, On the Learning of Deep Local Features for Robust Face Spoofing Detection, arXiv: 1806.07492v2, Oct. 11, 2018.*
Extended European Search Report issued in corresponding EP Application No. 21179290.8 dated Nov. 30, 2021 (9 pages).
Luo, Shiying et al. "Face Anti-Spoofing with Multi-Scale Information" 2018 24th International Conference on Pattern Recognition (ICPR), IEEE, Aug. 20, 2018, pp. 3402-3407 (6 pages).
Chen, Fu-Mei et al. "Face liveness detection: fusing colour texture feature and deep feature" IET Biometrics, IEEE, Michael Faraday House, Six Hills Way, Stevenage, Herts. SGI 2AY, UK, vol. 8, No. 6, Nov. 1, 2019, pp. 369-377 (9 pages).
Office Action issued in corresponding JP Application No. 2021-068318 with English translation dated Apr. 26, 2022 (5 pages).
Ito, Koichi et al. "A Liveness Detection Method Using Convolutional Neural Network" IEICE Transactions on Information and Systems A, Apr. 26, 2004, J100-A volume, No. 12, and p. 455-464 (27 pages).
Office Action issued in Chinese Application No. 202010681942.6, dated Jul. 13, 2023 (24 pages).
Request for the Submission of an Opinion issued in Korean Application No. 10-2021-0091448, dated Jul. 30, 2023 (15 pages).

* cited by examiner

METHOD FOR DETECTING FACE SYNTHETIC IMAGE, ELECTRONIC DEVICE, AND STORAGE MEDIUM

CROSS-REFERENCE TO RELATED APPLICATIONS

This application claims the benefit of priority to Chinese Application No. 202010681942.6, filed on Jul. 15, 2020, the contents of which are incorporated herein by reference in their entirety.

TECHNICAL FIELD

The present disclosure relates to a field of computer technology and further to artificial intelligence, particularly relates to deep learning and image recognition, and more particularly, to a method for detecting a face synthetic image, an electronic device and a storage medium.

BACKGROUND

Face synthetic image detection is to determine whether a face in an image is a synthetic face, and a module implementing the face synthetic image detection is a basic module of a face recognition system, which is used to ensure safety of the face recognition system. The face synthetic image detection algorithm based on a deep learning technology is a mainstream method in the field. The existing face synthetic image detection algorithm mainly uses a deep learning method of a neural network. The face synthetic image detection using the deep learning method includes a synthetic image determination based on a convolution neural network, a synthetic image determination based on a long short-term memory (LSTM) network or the like.

SUMMARY

The present disclosure provides a method for detecting a face synthetic image, an electronic device and a storage medium.

According to a first aspect of embodiments of the present disclosure, there is provided a method for detecting a face synthetic image. The method includes: inputting a face image to be detected into a pre-trained convolution neural network so as to perform feature extraction on the face image through the convolution neural network to obtain a raw image feature of the face image; inputting the raw image feature into a first full connected layer so as to perform calculation on the raw image feature through the first full connected layer to obtain a first feature vector corresponding to a face key point of the face image; inputting the raw image feature into a second full connected layer so as to perform calculation on the raw image feature through the second full connected layer to obtain a second feature vector corresponding to the face image; merging the first feature vector and the second feature vector to obtain a merged feature vector; inputting the merged feature vector to a third full connected layer so as to perform calculation on the merged feature vector through the third full connected layer to obtain a detection result of the face image, in which the detection result includes information indicating that the face image is one of a synthetic face image and a non-synthetic face image.

According to a second aspect of embodiments of the present disclosure, there is provided an electronic device, including one or more processors and a memory for storing one or more programs. When the one or more programs are executed by the one or more processors, the one or more processors are caused to implement the method for detecting a face synthetic image described in any embodiment of the present disclosure.

According to a third aspect of embodiments of the present disclosure, there is provided a storage medium have computer programs stored thereon, when the computer programs are executed by a processor, the processor is caused to implement the method for detecting a face synthetic image described in any embodiment of the present disclosure.

It is to be understood that the above summary of the present disclosure is not intended to describe the key or important features of embodiments of the present disclosure, and shall not be construed to limit the scope of the present disclosure. Additional features of embodiments of present disclosure will be given in part in the following descriptions, become apparent in part from the following descriptions.

BRIEF DESCRIPTION OF THE DRAWINGS

The drawings are used to generally understand the present disclosure and shall not be construed to limit the present disclosure.

DETAILED DESCRIPTION

Reference will now be made in detail to exemplary embodiments, which are illustrated in the accompanying drawings. The implementations set forth in the following description of exemplary embodiments do not represent all implementations consistent with the disclosure. It would be appreciated by those skilled in the art that the above embodiments cannot be construed to limit the present disclosure, and changes, alternatives, and modifications can be made in the embodiments without departing from spirit, principles and scope of the present disclosure. Also, for clarity and conciseness, some well-known functions and structures are omitted in the following descriptions.

In the related art, it is difficult for a face synthetic detection model to learn discriminative features of a synthetic image and a raw image, and an overfitting problem may occur in a small range of training samples, such that the generalization for unknown synthetic samples is limited. Further, when using a single convolution neural network, the robustness is poor if the face pose is significant or illumination difference is significant in a real scenario, which causes an unsatisfactory recognition effect.

The present disclosure provides a method for detecting a face synthetic image, an electronic device and a storage medium, which may relieve an overfitting problem in a face synthetic image detection, improve generalization and accuracy of the face synthetic image detection, and improve a detection effect of an unknown synthetic sample.

First Embodiment

Figure 1:
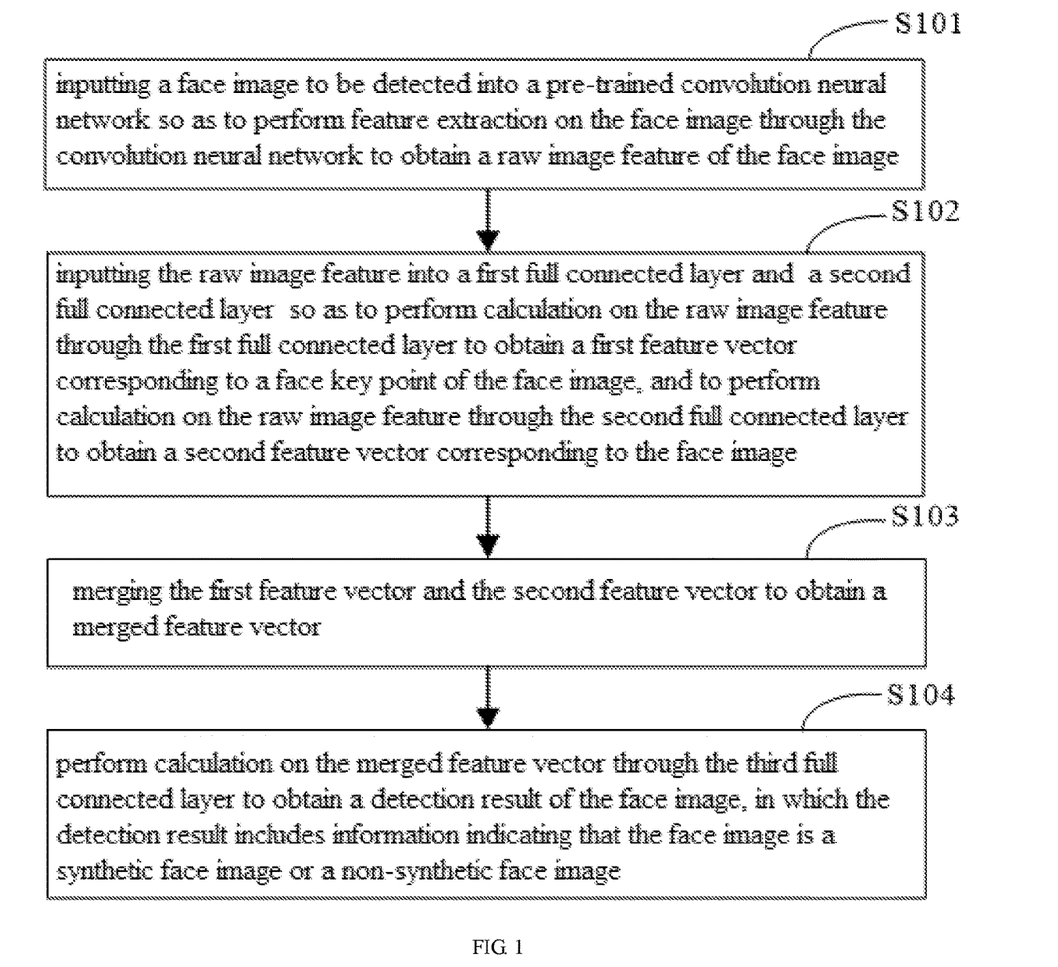
FIG. 1 is a flowchart of a method for detecting a face synthetic image according to a first embodiment of the present disclosure.

FIG. 1 is a flowchart of a method for detecting a face synthetic image according to the first embodiment of the present disclosure. The method may be performed by an apparatus for detecting a face synthetic image or an electronic device. The apparatus or the electronic device may be implemented in software and/or hardware, and may be integrated in any smart device having network communication functions. As illustrated in FIG. 1, the method may include the following.

At block S101, a face image to be detected is inputted into a pre-trained convolution neural network so as to perform feature extraction on the face image through the convolution neural network to obtain a raw image feature of the face image.

In an embodiment of the present disclosure, the electronic device may input the face image to be detected into the pre-trained convolution neural network and perform the feature extraction on the face image through the convolution neural network to obtain the raw image feature of the face image. In the embodiment, Resnet (Residual Network) may be adopted as the convolution neural network. Resnet is consisted of building blocks or bottlenecks. The building block includes a residual connection and a short-cut connection. An identity mapping added for the residual connection, which may transmit an output of a current layer to a next layer directly and may transmit a gradient of a next layer to a current layer directly in a backward propagation process. In this way, the vanishing gradient problem of deep layer network may be solved. Compared with the conventional image feature extarctors VGGNet and GoogleNet, Resnet has deeper layers such that more parameters can be used to describe image features and has a residual network structure which may reduce negative influences (such as the vanishing gradient problem in a training process) due to superposition of network layers. Therefore, Resnet has more excellent feature extraction function. In detail, in the embodiment of the present disclosure, Resnet18 may be adopted as the convolution neural network.

At block S102, the raw image feature of the face image is inputted into a first full connected layer and a second full connected layer, respectively, so as to perform calculation on the raw image feature through the first full connected layer to obtain a first feature vector corresponding to a face key point of the face image, and perform calculation on the raw image feature through the second full connected layer to obtain a second feature vector corresponding to the face image.

In an embodiment of the present disclosure, the electronic device may input the raw image feature into the first full connected layer and the second full connected layer respective, perform calculation on the raw image feature through the first full connected layer to obtain the first feature vector corresponding to the face key point of the face image, and perform calculation on the raw image feature through the second full connected layer to obtain the second feature vector corresponding to the face image. In an embodiment, when performing calculation on the raw image feature of the face image through the first full connected layer, the electronic device may extract respective face key points of the face image and image features of the respective face key points through the first full connected layer based on the raw image feature of the face image and obtain the first feature vector corresponding to the face key points based on the face key points and the image features of respective face key points. There may be 72 face key points and the first feature vector may be a 144-dimensional vector. In detail, the face key points can be represented by $(x_1,y_1)$, $(x_2,y_2)$, . . . $(x_{72},y_{72})$. In an embodiment, when performing calculation on the raw image feature of the face image through the second full connected layer, the electronic device may extract key image feature of the face image through the second full connected layer based on the raw image feature of the face image and obtain the second feature vector corresponding to the face image based on the key image feature. The second feature vector may be a 144-dimensional vector.

At block S103, the first feature vector and the second feature vector are merged to obtain a merged feature vector.

In an embodiment of the present disclosure, the electronic device may merge the first feature vector and the second feature vector to obtain the merged feature vector. In an embodiment, the electronic device may superpose the first feature vector and the second feature vector to obtain a 288-dimensional vector as the merged feature vector.

At block S104, the merged feature vector is inputted into a third full connected layer so as to perform calculation on the merged feature vector through the third full connected layer to obtain a detection result of the face image. The detection result includes information indicating that the face image is a synthetic face image or a non-synthetic face image.

In an embodiment of the present disclosure, the electronic device may input the merged feature vector input the third full connected layer and perform calculation on the merged feature vector through the third full connected layer to obtain the detection result of the face image. The detection result may include information indicating that the face image is a synthetic face image or a non-synthetic face image. In an embodiment, the electronic device may obtain a 2-dimensional vector through the third full connected layer and determine whether the face image is a synthetic face image or a non-synthetic face image through the 2-dimensional vector.

With the method for detecting a face synthetic image according to the embodiment of the present disclosure, the face image to be detected is inputted into the pre-trained convolution neural network to obtain the raw image feature of the face image through the convolution neural network, the raw image feature is inputted into the first full connected layer and the second full connected layer respectively to obtain the first feature vector corresponding to the face key point of the face image and the second feature vector corresponding to the face image through the first full connected layer and the second full connected layer respectively, and the first feature vector and the second feature vector are merged to obtain the merged feature vector which is inputted into the third full connected layer to obtain the detection result of the face image through the third full connected layer. In other words, in the present disclosure, the first feature vector corresponding to the face key point of the face image and the second feature vector corresponding to the face image can be obtained through the first full connected layer and the second full connected layer respectively, and the detection result of the face image can be obtained through the third full connected layer. However, in the existing face synthetic image detection method, the deep learning method of the neural network is used. It is difficult for this existing method to learn discriminative features of a synthetic image and a raw image, an overfitting problem may occur in a small range of training samples, the generalization for unknown synthetic samples is limited, and when using a single convolution neural network, the robustness is poor if the face pose is significant or illumination difference is significant in a real scenario, which causes an unsatisfactory recognition effect. In the present disclosure, since the face key point and the synthetic image are detected in combination, the present disclosure may solve the problems in the related art which may be described as follows, for example, it is difficult for a face synthetic detection model to learn discriminative features of a synthetic image and a raw image, an overfitting problem may occur in a small range of training samples, the generalization for unknown synthetic samples is limited, and when using a single convolution neural network, the robustness is poor if the face pose is significant or illumination difference is significant in a real scenario, which causes an unsatisfactory recognition effect. The technical solution provided in the present disclosure may relieve the overfitting problem in a face synthetic image detection, improve generalization and accuracy of the face synthetic image detection, and improve a detection effect of an unknown synthetic sample. Further, the technical solution in the present disclosure may be implemented easily, popularized conveniently and widely used.

Second Embodiment

Figure 2:
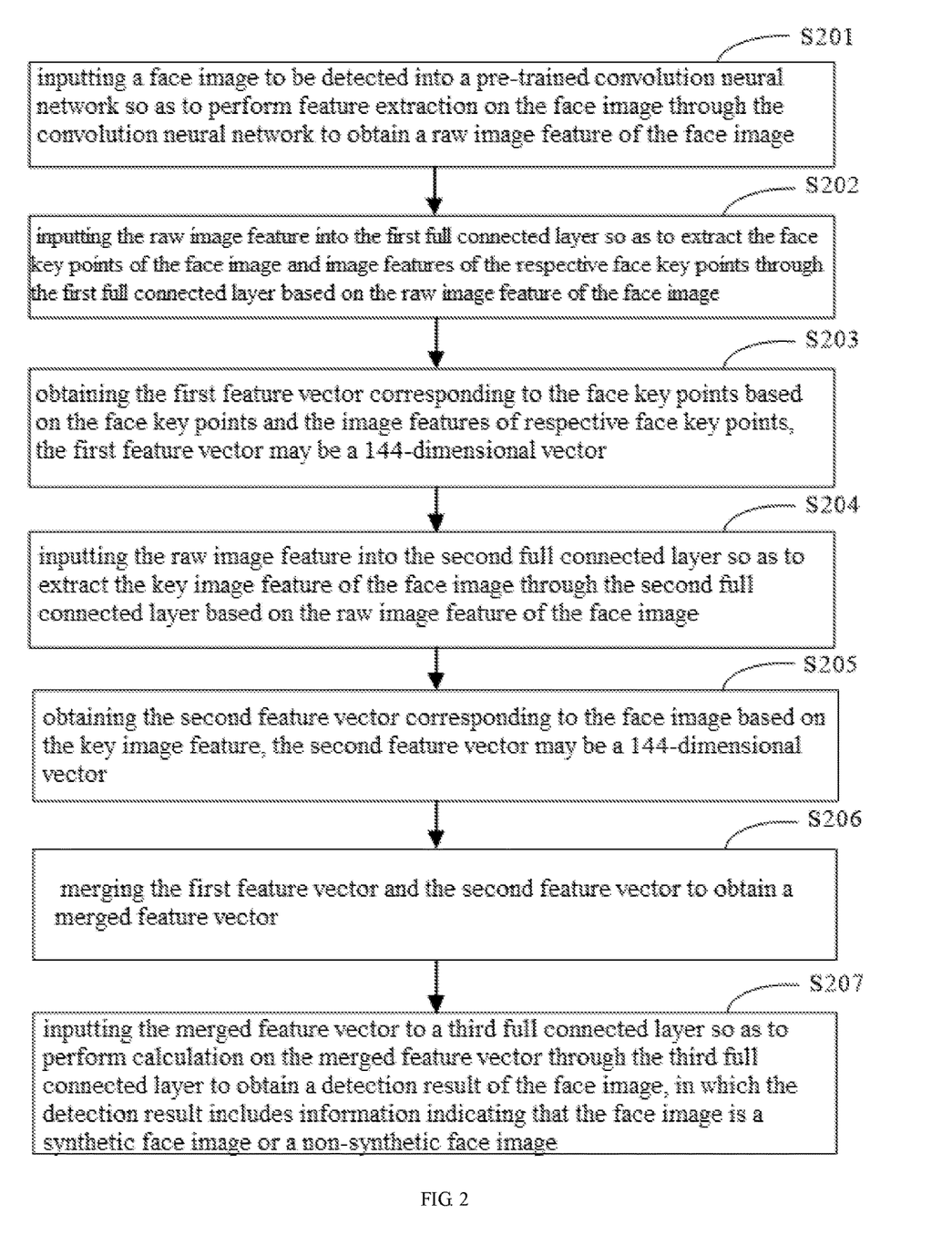
FIG. 2 is a flowchart of a method for detecting a face synthetic image according to a second embodiment of the present disclosure.

FIG. 2 is a flowchart of a method for detecting a face synthetic image according to the second embodiment of the present disclosure. As illustrated in FIG. 2, the method may include the following.

At block S201, a face image to be detected is inputted into a pre-trained convolution neural network so as to perform feature extraction on the face image through the convolution neural network to obtain a raw image feature of the face image.

At block S202, the raw image feature of the face image is inputted into a first full connected layer, so as to extract a face key point of the face image and an image feature of the face key point based on the raw image feature through the first full connected layer.

In an embodiment of the present disclosure, the electronic device may input the raw image feature into the first full connected layer and extract the face key points of the face image and image features of the respective face key points through the first full connected layer based on the raw image feature of the face image. There may be 72 face key points and the face key points can be represented by $(x_1, y_1)$, $(x_2, y_2)$, ... $(x_{72}, y_{72})$.

At block S203, the first feature vector corresponding to the face key point is obtained based on the face key point and the image feature of the face key point. The first feature vector may be a 144-dimensional vector.

In an embodiment of the present disclosure, the electronic device may obtain the first feature vector corresponding to the face key points based on the face key points and the image features of respective face key points. The first feature vector may be a 144-dimensional vector. In detail, each face key point corresponds to a 2-dimensional vector, such that the 144-dimensional vector can be obtained based on 72 face key points.

At block S204, the raw image feature of the face image is inputted into a second full connected layer, so as to extract a key image feature of the face image based on the raw image feature of the face image through the second full connected layer.

In an embodiment of the present disclosure, the electronic device may input the raw image feature into the second full connected layer, and extract the key image feature of the face image through the second full connected layer based on the raw image feature of the face image. In detail, assuming that the raw image feature of the face image is a 512-dimensional vector, in this block, the electronic device may generate a 144-dimensional vector as the key image feature of the face image according to the 512-dimensional vector.

At block S205, the second feature vector corresponding to the face image is obtained based on the key image feature. The second feature vector may be a 144-dimensional vector.

In an embodiment of the present disclosure, the electronic device may obtain the second feature vector corresponding to the face image based on the key image feature. The second feature vector may be a 144-dimensional vector. In detail, assuming that the key image feature of the face image is a 144-dimensional vector, in this block, the electronic device may determine the 144-dimensional vector as the second feature vector.

At block S206, the first feature vector and the second feature vector are merged to obtain a merged feature vector.

At block S207, the merged feature vector is inputted into a third full connected layer so as to perform calculation on the merged feature vector through the third full connected layer to obtain a detection result of the face image. The detection result includes information indicating that the face image is a synthetic face image or a non-synthetic face image.

With the method for detecting a face synthetic image according to the embodiment of the present disclosure, the face image to be detected is inputted into the pre-trained convolution neural network to obtain the raw image feature of the face image through the convolution neural network, the raw image feature is inputted into the first full connected layer and the second full connected layer respectively to obtain the first feature vector corresponding to the face key point of the face image and the second feature vector corresponding to the face image through the first full connected layer and the second full connected layer respectively, and the first feature vector and the second feature vector are merged to obtain the merged feature vector which is inputted into the third full connected layer to obtain the detection result of the face image through the third full connected layer. In other words, in the present disclosure, the first feature vector corresponding to the face key point of the face image and the second feature vector corresponding to the face image can be obtained through the first full connected layer and the second full connected layer respectively, and the detection result of the face image can be obtained through the third full connected layer. However, in the existing face synthetic image detection method, the deep learning method of the neural network is used. It is difficult for this existing method to learn discriminative features of a synthetic image and a raw image, an overfitting problem may occur in a small range of training samples, the generalization for unknown synthetic samples is limited, and when using a single convolution neural network, the robustness is poor if the face pose is significant or illumination difference is significant in a real scenario, which causes an unsatisfactory recognition effect. In the present disclosure, since the face key point and the synthetic image are detected in combination, the present disclosure may solve the problems in the related art which may be described as follows, for example, it is difficult for a face synthetic detection model to learn discriminative features of a synthetic image and a raw image, an overfitting problem may occur in a small range of training samples, the generalization for unknown synthetic samples is limited, and when using a single convolution neural network, the robustness is poor if the face pose is significant or illumination difference is significant in a real scenario, which causes an unsatisfactory recognition effect. The technical solution provided in the present disclosure may relieve the overfitting problem in a face synthetic image detection, improve generalization and accuracy of the face synthetic image detection, and improve a detection effect of an unknown synthetic sample. Further, the technical solution in the present disclosure may be implemented easily, popularized conveniently and widely used.

Third Embodiment

Figure 3:
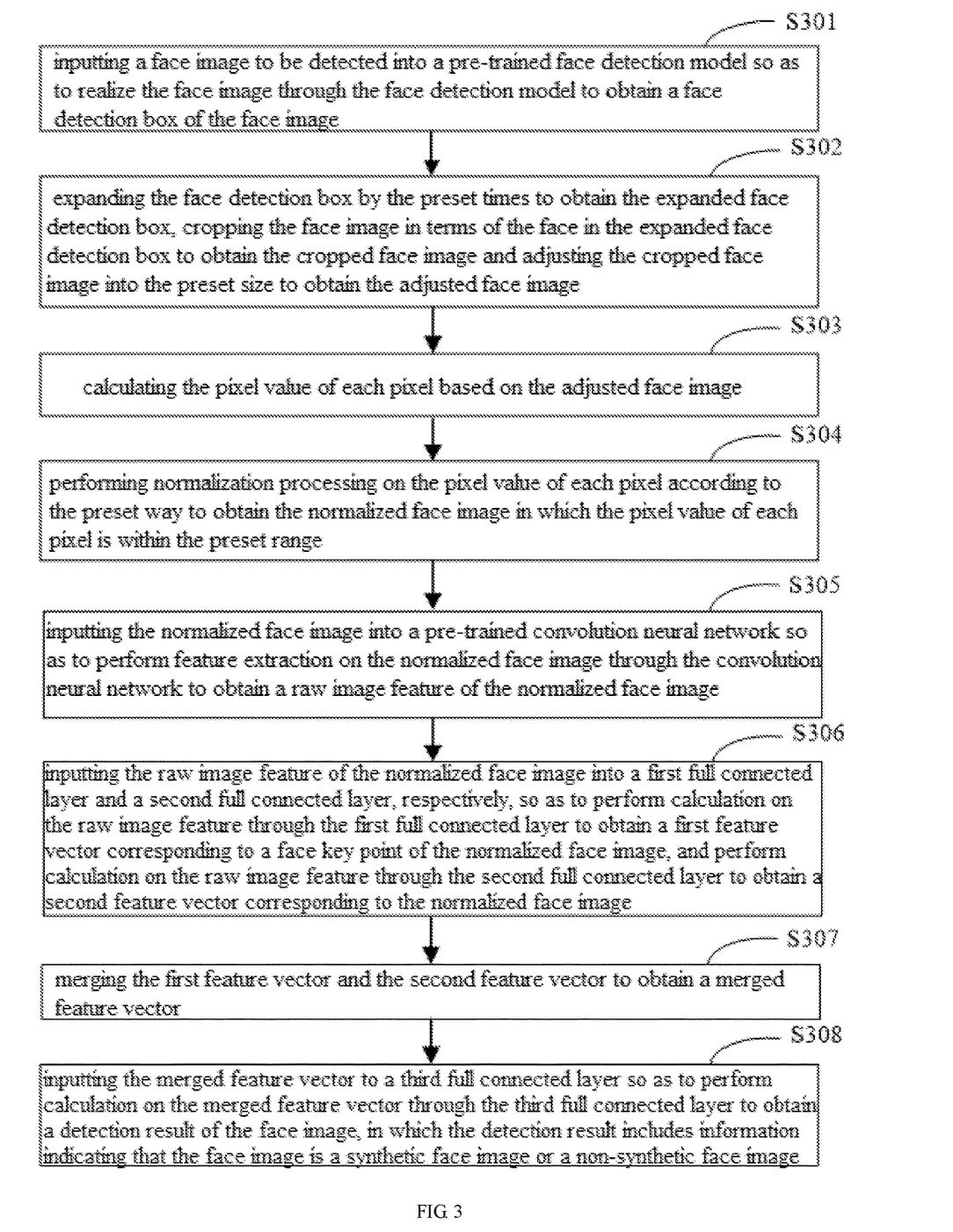
FIG. 3 is a flowchart of a method for detecting a face synthetic image according to a third embodiment of the present disclosure.

FIG. 3 is a flowchart of a method for detecting a face synthetic image according to the third embodiment of the present disclosure. As illustrated in FIG. 3, the method may include the following.

At block S301, a face image to be detected is inputted into a pre-trained face detection model so as to realize the face image through the face detection model to obtain a face detection box of the face image.

In an embodiment of the present disclosure, the electronic device may input the face image to be detected into the pre-trained face detection model and perform recognition on the face image through the face detection model, to obtain the face detection box of the face image. In detail, the electronic device may obtain a RGB image containing a face, input the RGB image into the pre-trained face detection model, and perform recognition on the RGB image through the pre-trained face detection model to obtain the face detection box of the RGB image. In the embodiment, the face detection model may be an existing face detection model, which may detection a position of the face.

At block S302, the face detection box is expanded by a preset times to obtain an expanded face detection box, the face image is cropped in terms of the face in the expanded face detection box to obtain a cropped face image, and the cropped face image is adjusted into a preset size to obtain an adjusted face image.

In an embodiment of the present disclosure, the electronic device may expand the face detection box by the preset times to obtain the expanded face detection box, crop the face image in terms of the face in the expanded face detection box to obtain the cropped face image and adjust the cropped face image into the preset size to obtain the adjusted face image. In detail, the electronic device may expand the face detection box by a factor of 1.5, crop the face image in terms of the face, and adjust the cropped face image to the same size 224×224.

At block S303, a pixel value of each pixel is calculated based on the adjusted face image.

In an embodiment of the present disclosure, the electronic device may calculate the pixel value of each pixel based on the adjusted face image. In detail, the electronic device may input the adjusted face image into a pixel calculation model, and calculate the pixel value of each pixel through the pixel calculation model.

At block S304, normalization processing is performed on the pixel value of each pixel according to a preset way to obtain a normalized face image, and the pixel value of each pixel in the normalized face image is within a preset range.

In an embodiment of the present disclosure, the electronic device may perform normalization processing on the pixel value of each pixel according to the preset way to obtain the normalized face image, and the pixel value of each pixel in the normalized face image is within the preset range. In detail, the electronic device may subtract 128 from the pixel value of each pixel and then divide the obtained value by 256 to enable the pixel value of each pixel to be within the range of [−0.5, 0.5]. Preferably, the electronic device may perform random number enhancement processing on the normalized face image.

At block S305, the normalized face image is inputted into a pre-trained convolution neural network so as to perform feature extraction on the normalized face image through the convolution neural network to obtain a raw image feature of the normalized face image.

At block S306, the raw image feature of the normalized face image is inputted into a first full connected layer and a second full connected layer, respectively, so as to perform calculation on the raw image feature through the first full connected layer to obtain a first feature vector corresponding to a face key point of the normalized face image, and perform calculation on the raw image feature through the second full connected layer to obtain a second feature vector corresponding to the normalized face image.

At block S307, the first feature vector and the second feature vector are merged to obtain a merged feature vector.

At block S308, the merged feature vector is inputted into a third full connected layer so as to perform calculation on the merged feature vector through the third full connected layer to obtain a detection result of the face image. The detection result includes information indicating that the face image is a synthetic face image or a non-synthetic face image.

It should be noted that, the processing on the normalized face image in blocks S305-S308 is the same as that on the face image to be detected in blocks S101-S104, which will be not repeated here.

Preferably, in the embodiment of the present disclosure, before inputting the face image to be detected into the pre-trained convolution neural network, the first full connected layer may be trained. In detail, the electronic device may configure a pre-obtained raw image feature of a first face image (i.e., a current face image) as a current raw image feature. If the first full connected layer does not satisfy a corresponding condition of convergence, the current raw image feature is inputted into the first full connected layer to use the current raw image feature to train the first full connected layer. A next face image of the current face image is configured as the current face image and the above process is repeated until the first full connected layer satisfies the corresponding condition of convergence.

Preferably, in the embodiment of the present disclosure, before inputting the face image to be detected into the pre-trained convolution neural network, the third full connected layer may be trained. In detail, the electronic device may configure a pre-obtained merged feature vector of a first face image (i.e., a current face image) as a current feature vector. If the third full connected layer does not satisfy a corresponding condition of convergence, the current feature vector is inputted into the third full connected layer to use the current feature vector to train the third full connected layer. A next face image of the current face image is configured as the current face image and the above process is repeated until the third full connected layer satisfies the corresponding condition of convergence.

Figure 4:
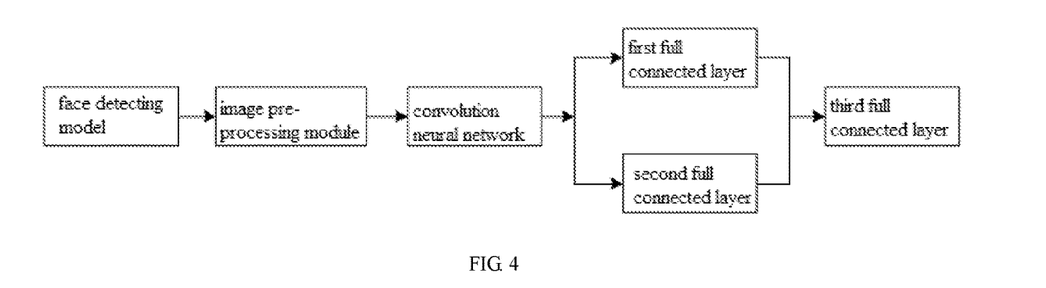
FIG. 4 is a block diagram of a face synthetic image detection system according to the third embodiment of the present disclosure.

FIG. 4 is a block diagram of a face synthetic image detection system according to the third embodiment of the present disclosure. As illustrated in FIG. 4, the face synthetic image detection system may include a face detecting module, an image pre-processing module, a convolution neural network, a first full connected layer, a second full connected layer, and a third full connected layer. The face detecting module is configured to detect a face in a face image to be detected to obtain a face detection box in the face image. A detection model may be an existing face detection model, which may detect a position of the face. The image pre-processing module is configured to pre-process the face detection box in the face image. In detail, the face detection box is expanded by a factor of 1.5, and the face image is cropped within the expanded face detection box for the purpose of extracting the face to obtain a cropped face image. The cropped face image is adjusted to the same size 224×224 to obtain an adjusted face image. Further, the electronic device may further perform normalization processing on the adjusted face image. In detail, the electronic device may subtract 128 from a pixel value of each pixel in the adjusted face image and then divide the obtained value by 256 to enable the pixel value of each pixel to be within the range of [−0.5, 0.5]. Preferably, the electronic device may perform random number enhancement processing on the normalized face image. The convolution neural network is configured to use ResNet18 to perform feature extraction on the face image to be detected. And after a global average pooling on the feature map from the last layer, the calculation is performed through two full connected layers. A 144-dimensional vector corresponding to 72 face key points is obtained through one full connected layer Fc1 (the first full connected layer). A 144-dimensional vector corresponding to the face image to be detected is obtained through the other full connected layer Fc2 (the second full connected layer). The two 144-dimensional vectors outputted from Fc1 and Fc2 are merged to obtain a 288-dimensional vector. A 2-dimensional vector is obtained through a full connected layer Fc3 (the third full connected layer) to determine whether the face image to be detected is a synthetic face image or non-synthetic face image.

The face synthetic image detection is a basic technology in the face related field, which is applicable in security and protection, check on work attendance, finance, door access control or other scenarios, and is wildly used in many businesses. According to the technical solution provided in the present disclosure, by means of prior information indicating that the face synthetic image is mainly based on key point chartlets, the key points and the synthetic image are detected in combination, which may introduce more supervisory information for the synthetic image detection and relieve the overfitting problem in the synthetic image detection. Further, the model is caused to pay more attention on a joint mark in a key point region of the face synthetic image, and to extract discriminative features of the synthetic image and the raw image for classification. Thus, the present disclosure may improve performance of the face detection technology, facilitate improving effect and user experience of an application with the face detection technology as basis, and further facilitate promotion of businesses.

With the method for detecting a face synthetic image according to the embodiment of the present disclosure, the face image to be detected is inputted into the pre-trained convolution neural network to obtain the raw image feature of the face image through the convolution neural network, the raw image feature is inputted into the first full connected layer and the second full connected layer respectively to obtain the first feature vector corresponding to the face key point of the face image and the second feature vector corresponding to the face image through the first full connected layer and the second full connected layer respectively, and the first feature vector and the second feature vector are merged to obtain the merged feature vector which is inputted into the third full connected layer to obtain the detection result of the face image through the third full connected layer. In other words, in the present disclosure, the first feature vector corresponding to the face key point of the face image and the second feature vector corresponding to the face image can be obtained through the first full connected layer and the second full connected layer respectively, and the detection result of the face image can be obtained through the third full connected layer. However, in the existing face synthetic image detection method, the deep learning method of the neural network is used. It is difficult for this existing method to learn discriminative features of a synthetic image and a raw image, an overfitting problem may occur in a small range of training samples, the generalization for unknown synthetic samples is limited, and when using a single convolution neural network, the robustness is poor if the face pose is significant or illumination difference is significant in a real scenario, which causes an unsatisfactory recognition effect. In the present disclosure, since the face key point and the synthetic image are detected in combination, the present disclosure may solve the problems in the related art which may be described as follows, for example, it is difficult for a face synthetic detection model to learn discriminative features of a synthetic image and a raw image, an overfitting problem may occur in a small range of training samples, the generalization for unknown synthetic samples is limited, and when using a single convolution neural network, the robustness is poor if the face pose is significant or illumination difference is significant in a real scenario, which causes an unsatisfactory recognition effect. The technical solution provided in the present disclosure may relieve the overfitting problem in a face synthetic image detection, improve generalization and accuracy of the face synthetic image detection, and improve a detection effect of an unknown synthetic sample. Further, the technical solution in the present disclosure may be implemented easily, popularized conveniently and widely used.

Fourth Embodiment

Figure 5:
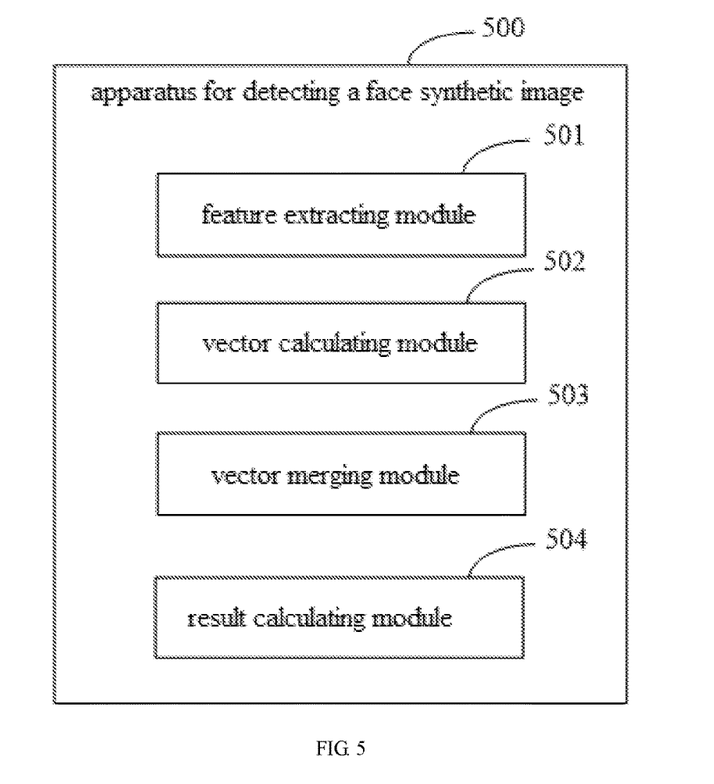
FIG. 5 is a first block diagram of an apparatus for detecting a face synthetic image according to a fourth embodiment of the present disclosure.

FIG. 5 is a first block diagram of an apparatus for detecting a face synthetic image according to the fourth embodiment of the present disclosure. As illustrated in FIG. 5, the apparatus 500 includes a feature extracting module 501, a vector calculating module 502, a vector merging module 503 and a result calculating module 504.

The feature extracting module 501 is configured to input a face image to be detected into a pre-trained convolution neural network so as to perform feature extraction on the face image through the convolution neural network to obtain a raw image feature of the face image.

The vector calculating module 502 is configured to input the raw image feature into a first full connected layer so as to perform calculation on the raw image feature through the first full connected layer to obtain a first feature vector corresponding to a face key point of the face image, and to input the raw image feature into a second full connected layer so as to perform calculation on the raw image feature through the second full connected layer to obtain a second feature vector corresponding to the face image.

The vector merging module 503 is configured to merge the first feature vector and the second feature vector to obtain a merged feature vector.

The result calculating module 504 is configured to input the merged feature vector to a third full connected layer so as to perform calculation on the merged feature vector through the third full connected layer to obtain a detection result of the face image, in which the detection result includes information indicating that the face image is a synthetic face image or a non-synthetic face image.

Further, the vector calculating module 502 is configured to extract the face key point of the face image and an image feature of the face key point through the first full connected layer based on the raw image feature of the face image, and obtain the first feature vector corresponding to the face key point based on the face key point and the image feature of the face key point. The first feature vector is a 144-dimensional vector.

Further, the vector calculating module 502 is configured to extract a key image feature of the face image through the second full connected layer based on the raw image feature of the face image, and obtain the second feature vector corresponding to the face image based on the key image feature. The second feature vector is a 144-dimensional vector.

Figure 6:
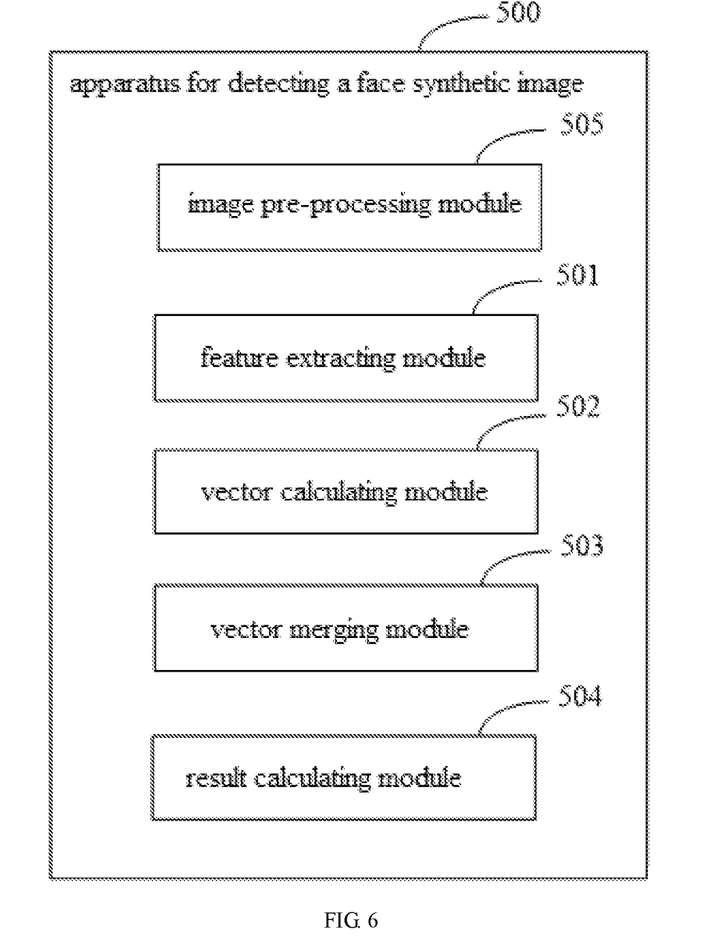
FIG. 6 is a second block diagram of an apparatus for detecting a face synthetic image according to a fourth embodiment of the present disclosure.

FIG. 6 is a second block diagram of an apparatus for detecting a face synthetic image according to the fourth embodiment of the present disclosure. As illustrated in FIG. 6, the apparatus 500 further includes an image pre-processing module 505 configured to input the face image to be detected into a pre-trained face detection model so as to perform recognition on the face image through the face detection model, to obtain a face detection box of the face image, expand the face detection box by a preset times to obtain an expanded face detection box, crop the face image in terms of a face in the expanded face detection box to obtain a cropped face image and adjust the cropped face image into a preset size to obtain an adjusted face image, and input the adjusted face image into the pre-trained convolution neural network.

Further, the image pre-processing module 505 is configured to calculate a pixel value of each pixel based on the adjusted face image, perform normalization processing on the pixel value of each pixel according to a preset way to obtain a normalized face image in which the pixel value of each pixel is within a preset range, and input the normalized face image into the pre-trained convolution neural network.

Further, the apparatus further includes a first training module 506 (not shown), configured to take a pre-obtained raw image feature of a first face image as a current raw image feature, input the current raw image feature into the first full connected layer to use the current raw image feature to train the first full connected layer when the first full connected layer does not satisfy a condition of convergence corresponding to the first full connected layer, take a next face image of the current face image as the current face image and repeat the above process until the first full connected layer satisfies the condition of convergence.

Further, the apparatus further includes a second training module 507 (not shown), configured to take a pre-obtained merged feature vector of a first face image as a current feature vector, input the current feature vector into the third full connected layer to use the current feature vector to train the third full connected layer when the third full connected layer does not satisfy a condition of convergence corresponding to the third full connected layer, take a next face image of the current face image as the current face image and repeat the above process until the third full connected layer satisfies the condition of convergence.

The above apparatus for detecting a face synthetic image may implement the method provided in any embodiment of the present disclosure, and have functional modules for implementing the method and beneficial effects. Details are not described in the embodiment, and reference can be made to the method for detecting a face synthetic image in any embodiment of the present disclosure.

Fifth Embodiment

According to embodiments of the present disclosure, there is further provided an electronic device and a computer readable storage medium.

Figure 7:
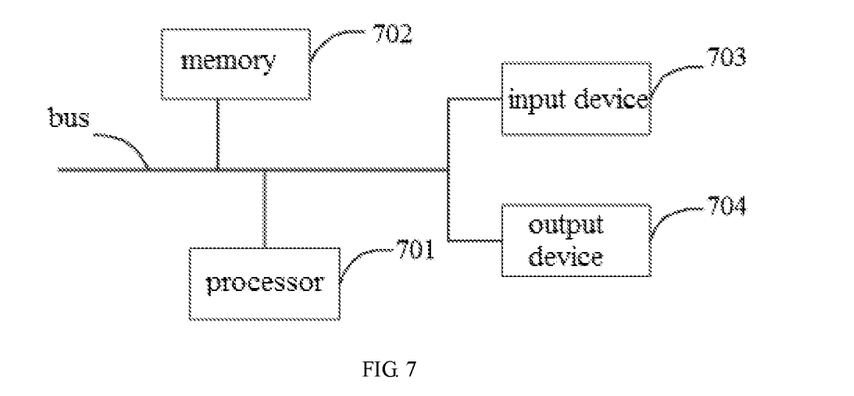
FIG. 7 is a block diagram of an electronic device for implementing a method for detecting a face synthetic image according to an embodiment of the present disclosure.

FIG. 7 is a block diagram of an electronic device for implementing a method for detecting a face synthetic image according to an embodiment of the present disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 7, the electronic device includes: one or more processors 701, memory 702, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). A processor 701 is taken as an example in FIG. 7.

The memory 702 is a non-transitory computer-readable storage medium according to the disclosure. The memory stores instructions executable by at least one processor, so that the at least one processor executes the method according to the disclosure. The non-transitory computer-readable storage medium of the disclosure stores computer instructions, which are used to cause a computer to execute the method according to the disclosure.

As a non-transitory computer-readable storage medium, the memory 702 is configured to store non-transitory software programs, non-transitory computer executable programs and modules, such as program instructions/modules (for example, the feature extracting module 501, the vector calculating module 502, and the vector merging module 503 and the result calculating module 504 shown in FIG. 5) corresponding to the method in the embodiment of the present disclosure. The processor 701 executes various functional applications and data processing of the server by running non-transitory software programs, instructions, and modules stored in the memory 702, that is, implementing the method in the foregoing method embodiments.

The memory 702 may include a storage program area and a storage data area, where the storage program area may store an operating system and application programs required for at least one function. The storage data area may store data created according to the use of the electronic device for implementing the method. In addition, the memory 702 may include a high-speed random access memory, and a non-transitory memory, such as at least one magnetic disk storage device, a flash memory device, or other non-transitory solid-state storage device. In some embodiments, the memory 702 may optionally include a memory remotely disposed with respect to the processor 701, and these remote memories may be connected to the electronic device for implementing the method through a network. Examples of the above network include, but are not limited to, the Internet, an intranet, a local area network, a mobile communication network, and combinations thereof.

The electronic device for implementing the method may further include: an input device 703 and an output device 704. The processor 701, the memory 702, the input device 703, and the output device 704 may be connected through a bus or in other manners. In FIG. 7, the connection through the bus is taken as an example.

The input device 703 may receive inputted numeric or character information, and generate key signal inputs related to user settings and function control of an electronic device for implementing the method, such as a touch screen, a keypad, a mouse, a trackpad, a touchpad, an indication rod, one or more mouse buttons, trackballs, joysticks and other input devices. The output device 704 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, sound input, or tactile input).

The systems and technologies described herein can be implemented in a computing system that includes background components (for example, a data server), or a computing system that includes middleware components (for example, an application server), or a computing system that includes front-end components (For example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other. The server may be a cloud server, also called as cloud computing server or cloud host, which is a host product in a cloud computing service, aims to solve the problem that the management difficulty is big and the expansibility is low in the conventional physical host and VPS service.

In the technical solution of the present disclosure, the face image to be detected is inputted into the pre-trained convolution neural network to obtain the raw image feature of the face image through the convolution neural network, the raw image feature is inputted into the first full connected layer and the second full connected layer respectively to obtain the first feature vector corresponding to the face key point of the face image and the second feature vector corresponding to the face image through the first full connected layer and the second full connected layer respectively, and the first feature vector and the second feature vector are merged to obtain the merged feature vector which is inputted into the third full connected layer to obtain the detection result of the face image through the third full connected layer. In other words, in the present disclosure, the first feature vector corresponding to the face key point of the face image and the second feature vector corresponding to the face image can be obtained through the first full connected layer and the second full connected layer respectively, and the detection result of the face image can be obtained through the third full connected layer. However, in the existing face synthetic image detection method, the deep learning method of the neural network is used. It is difficult for this existing method to learn discriminative features of a synthetic image and a raw image, an overfitting problem may occur in a small range of training samples, the generalization for unknown synthetic samples is limited, and when using a single convolution neural network, the robustness is poor if the face pose is significant or illumination difference is significant in a real scenario, which causes an unsatisfactory recognition effect. In the present disclosure, since the face key point and the synthetic image are detected in combination, the present disclosure may solve the problems in the related art which may be described as follows, for example, it is difficult for a face synthetic detection model to learn discriminative features of a synthetic image and a raw image, an overfitting problem may occur in a small range of training samples, the generalization for unknown synthetic samples is limited, and when using a single convolution neural network, the robustness is poor if the face pose is significant or illumination difference is significant in a real scenario, which causes an unsatisfactory recognition effect. The technical solution provided in the present disclosure may relieve the overfitting problem in a face synthetic image detection, improve generalization and accuracy of the face synthetic image detection, and improve a detection effect of an unknown synthetic sample. Further, the technical solution in the present disclosure may be implemented easily, popularized conveniently and widely used.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the present disclosure. Those skilled in the art should understand that various modifications, combinations, sub-combinations and substitutions can be made according to design requirements and other factors. All modifications, equivalents, variants and improvements made within the spirit and principle of the present disclosure shall fall within the protection scope of the present disclosure.

What is claimed is:

1. A method for detecting a face synthetic image, comprising:
   inputting a face image to be detected into a pre-trained convolution neural network so as to perform feature extraction on the face image through the convolution neural network to obtain a raw image feature of the face image;
   inputting the raw image feature into a first full connected layer so as to perform calculation on the raw image feature through the first full connected layer to obtain a first feature vector corresponding to a face key point of the face image, and inputting the raw image feature into a second full connected layer so as to perform calculation on the raw image feature through the second full connected layer to obtain a second feature vector corresponding to the face image;
   merging the first feature vector and the second feature vector to obtain a merged feature vector; and
   inputting the merged feature vector to a third full connected layer so as to perform calculation on the merged feature vector through the third full connected layer to obtain a detection result of the face image, wherein the detection result comprises information indicating that the face image is one of a synthetic face image and a non-synthetic face image.

2. The method of claim 1, wherein the inputting the raw image feature into the first full connected layer so as to perform calculation on the raw image feature through the first full connected layer to obtain the first feature vector corresponding to the face key point of the face image comprises:
   extracting the face key point of the face image and an image feature of the face key point through the first full connected layer based on the raw image feature of the face image;
   obtaining the first feature vector corresponding to the face key point based on the face key point and the image feature of the face key point, wherein the first feature vector is a 144-dimensional vector.

3. The method of claim 1, wherein the inputting the raw image feature into the second full connected layer so as to perform calculation on the raw image feature through the second full connected layer to obtain the second feature vector corresponding to the face image comprises:
   extracting a key image feature of the face image through the second full connected layer based on the raw image feature of the face image;
   obtaining the second feature vector corresponding to the face image based on the key image feature, wherein the second feature vector is a 144-dimensional vector.

4. The method of claim 1, further comprising:
   inputting the face image into a pre-trained face detection model so as to perform recognition on the face image through the face detection model, to obtain a face detection box of the face image;
   expanding the face detection box by a preset times to obtain an expanded face detection box;
   cropping the face image in terms of a face in the expanded face detection box to obtain a cropped face image;
   adjusting the cropped face image into a preset size to obtain an adjusted face image; and
   performing a step of inputting the adjusted face image into the pre-trained convolution neural network.

5. The method of claim 4, further comprising:
   calculating a pixel value of each pixel based on the adjusted face image;
   performing normalization processing on the pixel value of each pixel according to a preset way to obtain a normalized face image in which the pixel value of each pixel is within a preset range; and
   performing a step of inputting the normalized face image into the pre-trained convolution neural network.

6. The method of claim 1, further comprising:
   taking a pre-obtained raw image feature of a current face image as a current raw image feature;
   inputting the current raw image feature into the first full connected layer to use the current raw image feature to train the first full connected layer when the first full connected layer does not satisfy a condition of convergence corresponding to the first full connected layer;
   taking a next face image of the current face image as the current face image; and
   repeating the above steps of taking and inputting until the first full connected layer satisfies the condition of convergence.

7. The method of claim 1, further comprising:
   taking a pre-obtained merged feature vector of a current face image as a current feature vector;

inputting the current feature vector into the third full connected layer to use the current feature vector to train the third full connected layer when the third full connected layer does not satisfy a condition of convergence corresponding to the third full connected layer;
taking a next face image of the current face image as the current face image; and
repeating the above steps of taking and inputting until the third full connected layer satisfies the condition of convergence.

8. An electronic device, comprising:
at least one processor; and
a memory communicatively connected to the at least one processor;
wherein the memory stores instructions executable by the at least one processor, the instructions are executed by the at least one processor to cause the at least one processor to perform the method for detecting a face synthetic image, comprising:
inputting a face image to be detected into a pre-trained convolution neural network so as to perform feature extraction on the face image through the convolution neural network to obtain a raw image feature of the face image;
inputting the raw image feature into a first full connected layer so as to perform calculation on the raw image feature through the first full connected layer to obtain a first feature vector corresponding to a face key point of the face image, and inputting the raw image feature into a second full connected layer so as to perform calculation on the raw image feature through the second full connected layer to obtain a second feature vector corresponding to the face image;
merging the first feature vector and the second feature vector to obtain a merged feature vector; and
inputting the merged feature vector to a third full connected layer so as to perform calculation on the merged feature vector through the third full connected layer to obtain a detection result of the face image, wherein the detection result comprises information indicating that the face image is one of a synthetic face image and a non-synthetic face image.

9. The electronic device of claim 8, wherein the inputting the raw image feature into the first full connected layer so as to perform calculation on the raw image feature through the first full connected layer to obtain the first feature vector corresponding to the face key point of the face image comprises:
extracting the face key point of the face image and an image feature of the face key point through the first full connected layer based on the raw image feature of the face image;
obtaining the first feature vector corresponding to the face key point based on the face key point and the image feature of the face key point, wherein the first feature vector is a 144-dimensional vector.

10. The electronic device of claim 8, wherein the inputting the raw image feature into the second full connected layer so as to perform calculation on the raw image feature through the second full connected layer to obtain the second feature vector corresponding to the face image comprises:
extracting a key image feature of the face image through the second full connected layer based on the raw image feature of the face image;
obtaining the second feature vector corresponding to the face image based on the key image feature, wherein the second feature vector is a 144-dimensional vector.

11. The electronic device of claim 8, wherein the processor is further caused to perform the following:
inputting the face image into a pre-trained face detection model so as to perform recognition on the face image through the face detection model, to obtain a face detection box of the face image;
expanding the face detection box by a preset times to obtain an expanded face detection box;
cropping the face image in terms of a face in the expanded face detection box to obtain a cropped face image;
adjusting the cropped face image into a preset size to obtain an adjusted face image; and
performing a step of inputting the adjusted face image into the pre-trained convolution neural network.

12. The electronic device of claim 11, wherein the processor is further caused to perform the following:
calculating a pixel value of each pixel based on the adjusted face image;
performing normalization processing on the pixel value of each pixel according to a preset way to obtain a normalized face image in which the pixel value of each pixel is within a preset range; and
performing a step of inputting the normalized face image into the pre-trained convolution neural network.

13. The electronic device of claim 8, wherein the processor is further caused to perform the following:
taking a pre-obtained raw image feature of a current face image as a current raw image feature;
inputting the current raw image feature into the first full connected layer to use the current raw image feature to train the first full connected layer when the first full connected layer does not satisfy a condition of convergence corresponding to the first full connected layer;
taking a next face image of the current face image as the current face image; and
repeating the above steps of taking and inputting until the first full connected layer satisfies the condition of convergence.

14. The electronic device of claim 8, wherein the processor is further caused to perform the following:
taking a pre-obtained merged feature vector of a current face image as a current feature vector;
inputting the current feature vector into the third full connected layer to use the current feature vector to train the third full connected layer when the third full connected layer does not satisfy a condition of convergence corresponding to the third full connected layer;
taking a next face image of the current face image as the current face image; and
repeating the above steps of taking and inputting until the third full connected layer satisfies the condition of convergence.

15. A non-transitory computer readable storage medium, having computer instructions stored therein, wherein the computer instructions are configured to cause a computer to perform the method for detecting a face synthetic image, comprising:
inputting a face image to be detected into a pre-trained convolution neural network so as to perform feature extraction on the face image through the convolution neural network to obtain a raw image feature of the face image;
inputting the raw image feature into a first full connected layer so as to perform calculation on the raw image feature through the first full connected layer to obtain a first feature vector corresponding to a face key point of the face image, and inputting the raw image feature into a second full connected layer so as to perform calculation on the raw image feature through the second full connected layer to obtain a second feature vector corresponding to the face image;

merging the first feature vector and the second feature vector to obtain a merged feature vector; and inputting the merged feature vector to a third full connected layer so as to perform calculation on the merged feature vector through the third full connected layer to obtain a detection result of the face image, wherein the detection result comprises information indicating that the face image is one of a synthetic face image and a non-synthetic face image.

16. The non-transitory computer readable storage medium of claim 15, wherein the inputting the raw image feature into the first full connected layer so as to perform calculation on the raw image feature through the first full connected layer to obtain the first feature vector corresponding to the face key point of the face image comprises:

extracting the face key point of the face image and an image feature of the face key point through the first full connected layer based on the raw image feature of the face image;

obtaining the first feature vector corresponding to the face key point based on the face key point and the image feature of the face key point, wherein the first feature vector is a 144-dimensional vector.

17. The non-transitory computer readable storage medium of claim 15, wherein the inputting the raw image feature into the second full connected layer so as to perform calculation on the raw image feature through the second full connected layer to obtain the second feature vector corresponding to the face image comprises:

extracting a key image feature of the face image through the second full connected layer based on the raw image feature of the face image;

obtaining the second feature vector corresponding to the face image based on the key image feature, wherein the second feature vector is a 144-dimensional vector.

18. The non-transitory computer readable storage medium of claim 15, wherein the processor is further caused to perform the following:

inputting the face image into a pre-trained face detection model so as to perform recognition on the face image through the face detection model, to obtain a face detection box of the face image;

expanding the face detection box by a preset times to obtain an expanded face detection box;

cropping the face image in terms of a face in the expanded face detection box to obtain a cropped face image;

adjusting the cropped face image into a preset size to obtain an adjusted face image; and performing a step of inputting the adjusted face image into the pre-trained convolution neural network.

19. The non-transitory computer readable storage medium of claim 15, wherein the processor is further caused to perform the following:

taking a pre-obtained raw image feature of a current face image as a current raw image feature;

inputting the current raw image feature into the first full connected layer to use the current raw image feature to train the first full connected layer when the first full connected layer does not satisfy a condition of convergence corresponding to the first full connected layer;

taking a next face image of the current face image as the current face image; and repeating the above steps of taking and inputting until the first full connected layer satisfies the condition of convergence.

20. The non-transitory computer readable storage medium of claim 15, wherein the processor is further caused to perform the following:

taking a pre-obtained merged feature vector of a current face image as a current feature vector;

inputting the current feature vector into the third full connected layer to use the current feature vector to train the third full connected layer when the third full connected layer does not satisfy a condition of convergence corresponding to the third full connected layer;

taking a next face image of the current face image as the current face image; and repeating the above steps of taking and inputting until the third full connected layer satisfies the condition of convergence.

* * * * *